United States Patent
Hinkel et al.

(10) Patent No.: US 6,729,408 B2
(45) Date of Patent: May 4, 2004

(54) FRACTURING FLUID AND METHOD OF USE

(75) Inventors: Jerald Hinkel, Houston, TX (US); Ernest Brown, Katy, TX (US); Curtis Boney, Houston, TX (US); Gregory Sutton, Pearland, TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 13 days.

(21) Appl. No.: 10/117,499

(22) Filed: Apr. 5, 2002

(65) Prior Publication Data

US 2003/0188870 A1 Oct. 9, 2003

(51) Int. Cl.$^7$ .................................................. E21B 43/26
(52) U.S. Cl. ....................................... 166/308; 166/311
(58) Field of Search ............................... 166/305.1, 307, 166/308, 311; 507/239, 240, 248

(56) References Cited

U.S. PATENT DOCUMENTS

| | | | |
|---|---|---|---|
| 3,059,909 A | 10/1962 | Wise | 261/39 |
| 3,301,723 A | 1/1967 | Chrisp | 149/20 |
| 3,303,896 A | 2/1967 | Tillotson | 175/69 |
| 3,317,430 A | 5/1967 | Priestly | 252/152 |
| 3,888,312 A | 6/1975 | Tiner | 166/308 |
| 3,937,283 A | 2/1976 | Blauer et al. | 166/307 |
| 4,108,782 A | 8/1978 | Thompson | 252/855 |
| 4,113,631 A | 9/1978 | Thompson | 252/855 |
| 4,741,401 A | 5/1988 | Walles | 166/300 |
| 6,283,212 B1 | 9/2001 | Hinkel et al. | 166/279 |
| 6,291,406 B1 * | 9/2001 | Rose et al. | 507/239 |

OTHER PUBLICATIONS

Olsen, David K., *Use of Amine Oxide Surfactants For Chemical Flooding EOR,* Niper–417, Aug. 1989.
Gulbis, J. and Hodge, R.M., *Reservoir Stimulation,* John Wiley & Sons, Ltd., 3$^{rd}$ Edition, 2000 Chapter 7.
Constein, V.G.., et al., *Reservoir Stimulation,* John Wiley & Sons, Ltd., 3$^{rd}$ Edition, 2000 Chapter 8.

Holditch, S. A., *Factors Affecting Water Blocking and Gas Flow From Hydraulically Fractured Gas Wells,* SPE Paper 7561 presented at the 53$^{rd}$ Annual Fall Technical Conference and Exhibition of the Society of Petroleum Engineers Of AIME held in Houston, Texas, Oct. 1–3, 1978.

* cited by examiner

Primary Examiner—David Bagnell
Assistant Examiner—Jennifer R Dougherty
(74) Attorney, Agent, or Firm—Thomas O Mitchell; Brigitte L Echols; Robin Nava

(57) ABSTRACT

Improved aqueous fracturing fluids are disclosed that are particularly useful as well stimulation fluids to fracture tight (i.e., low permeability) subterranean formations. Gas wells treated with these fracturing fluids have rapid cleanup and enhanced well production. The fluids contain small but sufficient amounts of certain amine oxides to aid in the removal of the fracturing fluid from the formation. By facilitating the removal of fluid from the invaded zones, the amount of damage to the fracture faces in the formation is thereby minimized. The amine oxides correspond to the formula I, wherein $R_1$ is an aliphatic group of from 6 to about 20 carbon atoms, and wherein $R_2$ and $R_3$ are each independently alkyl of from 1 to about 4 carbon atoms. The amine oxides in which $R_1$ is an alkyl group are preferred, and those in which $R_1$ is an alkyl group of from 8 to 10 carbon atoms and $R_2$ and $R_3$ are each methyl or ethyl groups are most preferred Formula I

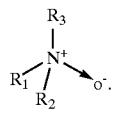

4 Claims, 1 Drawing Sheet

FRACTURING FLUID AND METHOD OF USE

FIELD OF THE INVENTION

Improved aqueous fracturing fluids have now been discovered that are particularly useful as well stimulation fluids to fracture tight (i.e., low permeability) subterranean formations. Gas wells treated with these fracturing fluids have rapid cleanup and enhanced well production. The fluids contain small but sufficient amounts of certain amine oxides to aid in the removal of the fracturing fluid from the formation. By facilitating the removal of fluid from the invaded zones, the amount of damage to the fracture faces in the formation is thereby minimized.

BACKGROUND OF THE INVENTION

Various amine oxides have been used as surfactants to create foams and remove "intrusion fluids from wellbores," according to U.S. Pat. No. 3,303,896 and they have been used as foam stabilizers, according to U.S. Pat. No. 3,317,430. Certain amine oxides have also been used in combination with quaternary ammonium compounds as foaming and silt suspending agents. See, for example, U.S. Pat. No. 4,108,782 and U.S. Pat. No. 4,113,631. The use of amine oxide surfactants for chemical flooding enhanced oil recovery was described in a topical report by David K. Olsen in NIPER-417 (August 1989) for work performed for the US Department of Energy under cooperative agreement DE-FC22-83FE60149 by the National Institute for Petroleum and Energy Research. However, to Applicants' knowledge, the amine oxides have not been used to improve the properties of fracturing fluids and to promote rapid cleanup, or to enhance well production from a well stimulated by hydraulic fracturing.

Hydraulic fracturing of subterranean formations has long been established as an effective means to stimulate the production of hydrocarbon fluids from a wellbore. In hydraulic fracturing, a well stimulation fluid (generally referred to as a fracturing fluid or a "frac fluid") is injected into and through a wellbore and against the surface of a subterranean formation penetrated by the wellbore at a pressure at least sufficient to create a fracture in the formation. Usually a "pad fluid" is injected first to create the fracture and then a fracturing fluid, often bearing granular propping agents, is injected at a pressure and rate sufficient to extend the fracture from the wellbore deeper into the formation. If a proppant is employed, the goal is generally to create a proppant filled zone (aka, the proppant pack) from the tip of the fracture back to the wellbore. In any event, the hydraulically induced fracture is more permeable than the formation and it acts as a pathway or conduit for the hydrocarbon fluids in the formation to flow to the wellbore and then to the surface where they are collected. The methods of fracturing are well known and they may be varied to meet the user's needs, but most follow this general procedure (which is greatly overly simplified).

The fluids used as fracturing fluids have also been varied, but many if not most are aqueous based fluids that have been "viscosified" or thickened by the addition of a natural or synthetic polymer (cross-linked or uncross-linked). The carrier fluid is usually water or a brine (e.g., dilute aqueous solutions of sodium chloride and/or potassium chloride). The viscosifying polymer is typically a solvatable (or hydratable) polysaccharide, such as a galactomannan gum, a glycomannan gum, or a cellulose derivative. Examples of such polymers include guar, hydroxypropyl guar, carboxymethyl guar, carboxymethylhydroxyethyl guar, hydroxyethyl cellulose, carboxymethyl-hydroxyethyl cellulose, hydroxypropyl cellulose, xanthan, polyacrylamides and other synthetic polymers. Of these, guar, hydroxypropyl guar and carboxymethlyhydroxyethyl guar are typically preferred because of commercial availability and cost performance.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. See, for example, U.S. Pat. No. 3,059,909 and numerous other patents that describe this classic aqueous gel as a fracture fluid. Other crosslinking agents include, for example, titanium crosslinkers (U.S. Pat. No. 3,888,312), chromium, iron, aluminum, and zirconium (U.S. Pat. No. 3,301,723). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium.

Additional information on fracturing is found in the description by Janet Gulbis and Richard M. Hodge in Chapter 7 of the text "Reservoir Stimulation" published by John Wiley & Sons, Ltd, Third Edition, 2000 (Editors, Michael J. Economides and Kenneth G. Nolte), which is incorporated herein by reference. Some fracturing fluids have also been energized by the addition of a gas (e.g., nitrogen or carbon dioxide) to create a foam. See, for example, the pioneering work by Roland E. Blauer and Clarence J. Durborow in U.S. Pat. No. 3,937,283 ("Formation Fracturing with Stable Foam"). The rheology of the traditional water-base polymer solutions and also complex fluids, such as foams, can be and typically is modified and augmented by several additives to control their performance. Fluid loss additives are typically added to reduce the loss of fracturing fluids into the formation.

The problems associated with the loss of fracturing fluid to the formation are well known. For example, in 1978 Holditch reported: "The fluid injected during the fracturing treatment will leak off into the formation and will reduce the relative permeability to gas in the invaded region. Near the fracture, the permeability to gas will be reduced to zero." In addition, Holditch said: "In some cases, the injected fracturing fluid may reduce the formation permeability in the invaded zone." Stephen A. Holditch, SPE 7561 (Presented at the 53$^{rd}$ Annual Fall Technical Conference and Exhibition of the Society of Petroleum Engineers of AIME, held in Houston, Tex., Oct. 1–3, 1978). The damage to the formation could be severe, and the practical so what of that is reduced flow of hydrocarbons, low production and poor economics on the well. While the state of the art has advanced substantially since Holditch reported on the problems associated with leak off of fracturing fluid, the problems remain the same. See, for example, Vernon G. Constien, George W. Hawkins, R. K. Prud'homme and Reinaldo Navarrete, Chapter 8 entitled "Performance of Fracturing Materials" and the other chapters on fracturing and well stimulation in "Reservoir Stimulation" published by John Wiley & Sons, Ltd, Third Edition, copyright Schlumberger 2000 (Editors, Michael J. Economides and Kenneth G. Nolte), the disclosure of which is incorporated herein by reference. These authors and others emphasize the importance of "cleanup" or "fracture cleanup" to optimize production of the hydrocarbon fluids from the well. The term "cleanup" or "fracture cleanup" refers to the process of removing the fracture fluid (without the proppant) from the fracture after the fracturing process has been completed. Techniques for promoting fracture cleanup often involved reducing the viscosity of the fracture fluid as much as practical so that it will more readily flow back toward the wellbore. So-called "breakers" have been used to reduce fluid viscosity in many instances. The breakers can be enzymes (oxidizers and oxidizer catalysts), and they may be encapsulated to delay their release. See, for example, U.S. Pat. No. 4,741,401 (Walles et al.), assigned to Schlumberger Dowell and incorporated herein by reference. Another technique to aid in the cleanup, albeit by a contrarian approach, is found in U.S. Pat. No. 6,283,212 (Hinkel and England), which is also assigned to Schlumberger Dowell and incorporated herein by reference.

The need for improved fracturing fluids still exists, and the need is met at least in part by the following invention.

SUMMARY OF THE INVENTION

Improved aqueous fracturing fluids have now been discovered that are particularly useful as well stimulation fluids to fracture tight (i.e., low permeability) subterranean formations. Gas wells treated with these fracturing fluids have rapid cleanup and enhanced well production. The fluids contain small but sufficient amounts of certain amine oxides to aid in the removal of the fracturing fluid from the formation. By facilitating the removal of fluid from the invaded zones, the amount of damage to the fracture faces in the formation is thereby minimized. The amine oxides correspond to the formula

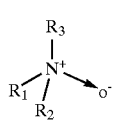
(formula I)

wherein $R_1$ is an aliphatic group of from 6 to about 20 carbon atoms, and wherein $R_2$ and $R_3$ are each independently alkyl of from 1 to about 4 carbon atoms. The amine oxides in which $R_1$ is an alkyl group are preferred, and those in which $R_1$ is an alkyl group of from 8 to 12 carbon atoms (in particular where $R_1$ is a linear alkyl group), and $R_2$ and $R_3$ are each methyl or ethyl groups are most preferred.

DETAILED DESCRIPTION OF THE INVENTION

Figure 1:
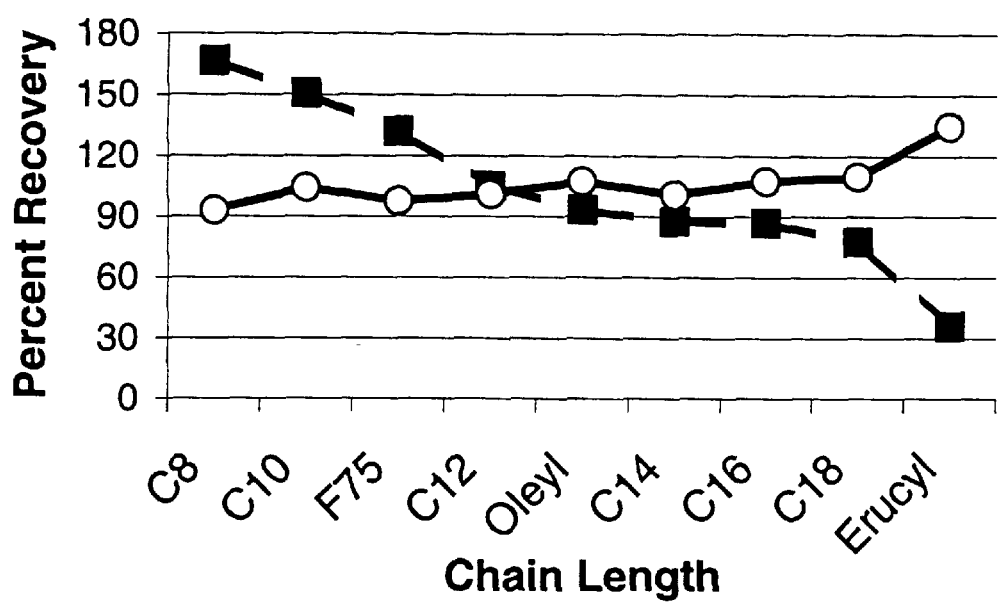
FIG. 1 is entitled Gas Permeability vs. Chain Length. This Figure plots the Percent Recovery of permeability vs. the Chain Length of the aliphatic group, $R_1$, of several amine oxides.

The amine oxides used in the present invention are known compounds and many are commercially available. They can be produced by various methods, one of which is by contacting a tertiary amine (corresponding to the formula $R_1R_2R_3N$, wherein $R_1$, $R_2$ and $R_3$ are as defined above) with a peroxide in a suitable aqueous reaction medium. The products thus produced are aqueous liquids having the amine oxides in up to 30 weight percent concentration. The aqueous solutions of the amine oxides is an easy and preferred form of the product in this invention because they can be easily pumped or otherwise metered into the fracturing fluid or blended with the other components of the fracturing fluid.

Examples of the amine oxides of formula I above include, but are not limited to, those in which $R_1$ is a straight chain alkyl group of 8 to 20 carbon atoms (e.g., octyl, nonyl, decyl, dodecyl, tetradecyl, octadecyl, and the like) or a straight chain alkenyl group of from 8 to 20 carbon atoms (e.g., oleyl, erucyl, and the like) and $R_2$ and $R_3$ are each methyl, ethyl, n-butyl or 2-hydroxyethyl groups. The most preferred amine oxides are n-octyldimethylamine oxide and n-decyldimethylamine oxide. While all of the amine oxides of formula I could reasonably be classified as surfactants, many are known foaming agents but the preferred amine oxides for use in the present invention (e.g., n-octyldimethylamine oxide and n-decyldimethylamine oxide) are not particularly efficient foaming agents. For instance, the preferred amine oxides have a foam half-life of less than one (1) minute when tested in 2 percent aqueous potassium chloride (2% KCl) solution, 3% hydrochloric acid, 0.2% aqueous tetramethylammonium chloride solution or API brine. The foam half-life is determined by the tests are set forth in U.S. Pat. No. 4,108,782, columns 5 and 6, under the headings "Initial Foam Volume Test" and "Foam Half-Life Test," the disclosure of which is incorporated herein by reference. The preferred amine oxides thus do not promote the formation of emulsions (foams are a type of emulsion) in the presence of the formation fluids and they provide a desirable change (i.e., increase) in the contact angle.

The amine oxides are added to the fracturing fluids in small but sufficient amounts to promote rapid clean-up. Normally, they are added as an aqueous solution in amounts of from about 0.01 to about 1 weight percent of amine oxide, weight-by-weight basis (w/w), and preferably from about 0.006 to about 0.024 weight percent. The amine oxides can be added "on-the-fly" to the fracturing fluid as it is being pumped into the wellbore or the amine oxides can be added to the so-called "frac tank" which holds the mix water for the fracturing fluid. The order of addition of the amine oxide to the fracturing fluid is not critical. The amine oxides seem to be compatible with essentially all ingredients of the fracture fluid, so far as Inventors are aware. They are compatible with acids (such as hydrochloric acid) and can, therefore, be used in so-called "acid frac" jobs where aqueous acid is used as the fracturing fluid (usually with acid inhibitors present). The amine oxides are also compatible with bases, and can be used in fracturing fluids having a basic pH which are common in fracturing fluids contain guar or guar derivatives (e.g., hydroxypropylguar ("HPG"), carboxymethyl guar, carboxymethyl-hydroxypropyl guar ("CMHPG")) as the viscosifiers; these fluids may be cross-linked with borates or zirconium or titanium cross-linking agents as well as other species). Fracture fluids normally have a pH range of from about 4 to about 12, and the amine oxides can be used in such fluids. Fracture fluids with a basic pH tend to be more thermally stable, and are thus generally preferred for use in fracturing low permeability formations. The fracturing fluids of the present invention can also contain other additives typically found in fracturing fluids. E.g., proppants, other fluid loss additives, non-emulsifiers, breaker systems, formation stabilizers, bactericides, and the like.

The fracturing fluids of the present invention are used in accordance with known procedures to fracture the subterranean formations. See, for example, the fracturing procedures set forth in the text "Reservoir Stimulation" cited above.

EXAMPLES OF THE INVENTION

The following examples will further illustrate the invention:

Example 1–9:

Various amine oxides, and one commercial fluorocarbon surfactant (identified as F75N; not an example of the invention), were tested in certain fluids in core flow tests using the procedures set forth below. The amine oxides each corresponded to Formula I:

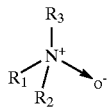

in which $R_2$ and $R_3$ are each methyl, and $R_1$ is n-octyl, n-decyl, n-dodecyl, n-tetradecyl, n-hexadecyl, oleyl, or erucyl (the later two groups are alkenyl groups of 18 and 22 carbon atoms, respectively). The data are plotted in FIG. 1 where the open circles correspond to the flow recovery with a brine flow, and the solid squares to the flow recovery with nitrogen. The detailed core flow procedures are given below. The data show that the amine oxides provide a percent recovery that differs with the chain length of the aliphatic $R_1$ group on the amine oxide. Surprisingly, those amine oxides in which the aliphatic $R_1$ group had 8 or 10 carbon atoms performed better (i.e., had a higher percent recovery) than the commercial F75N surfactant, one of the best additives in the industry for promoting rapid cleanup. The data in FIG. 1 also show that one can modify the rate of cleanup or permeability recovery by choosing an amine oxide with different chain lengths for the aliphatic $R_1$ group. This provides the user with a means to vary the rate at which cleanup is achieved and the well is produced. For example, if one wishes to achieve a rapid cleanup and production rate, the user would choose an amine oxide with a lower carbon number for $R_1$ (e.g., n-octyl or n-decyl). If the user wanted a lower cleanup rate (to prevent, for example, channeling and possible incomplete return of the fracture fluid), then the user could select an amine oxide with a higher carbon number for $R_1$ (e.g., n-hexadecyl or n-octadecyl or oleyl). It is expected that blends of such amine oxides could also be used to achieve any particularly desired cleanup result. The ability to vary the rate of flowback, and achieve a predictable and controllable means of cleaning up stimulation fluids to improve the post-treatment permeability to gas, is a useful tool in the arsenal of the engineer. The amine oxides are more environmentally "friendly" than the commercial fluorocarbon surfactant (F75N) and they are cost effective. It was also noted that the amine oxides in which $R_1$ has a higher carbon number (e.g., 16 or 18 or higher) were viscoelastic as well as surface active. This combination of surface activity and viscoelasticity makes these amine oxides effective in well treatments where friction reduction and good cleanup are particularly desirable. One industry leader provides such fracture fluids (i.e., aqueous viscoelastic fluids that do not contain guar or any guar derivative) under the identity of "slickwater" treatments.

Core Flow Procedures for Amine Oxide Evaluation
Brine Flow:
1. Pre-perm dry cores with N2 to match cores.
2. Saturate cores in DI water with 2% NaCl.
3. Determine initial permeability to 2% NaCl with flow in the forward direction for a total of 25 pore volumes.
4. Pump surfactant solution in the reverse direction for a total of five (5) pore volumes.
5. Determine regained permeability to 2% NaCl in the forward direction for a total of 25 pore volumes.
6. Determine ratio of the regained 2% NaCl permeability to the initial 2% NaCl permeability.

Kerosene Flow:
1. Pre-perm dry cores with N2 to match cores.
2. Saturate cores in DI water with 2% NaCl.
3. Determine initial permeability to 2% NaCl with flow in the forward direction for a total of 25 pore volumes.
4. Pump surfactant solution in the reverse direction for a total of five (5) pore volumes.
5. Determine regained permeability to kerosene in the forward direction for a total of 25 pore volumes.
6. Determine ratio of the regained kerosene permeability to the initial 2% NaCl permeability.

Nitrogen Flow:
1. Pre-perm dry cores with N2 to match cores.
2. Saturate cores in DI water with 2% NaCl.
3. Determine initial permeability to 2% NaCl with flow in the forward direction for a total of 25 pore volumes.
4. Pump surfactant solution in the reverse direction for a total of five (5) pore volumes.
5. Determine regained permeability to nitrogen in the forward direction at 100 psi for a total time equivalent to 25 pore volumes of brine at 1.0 mL/min (+/−140 minutes).
6. Determine ratio of the regained nitrogen permeability to the initial 2% NaCl permeability.

Pore Volume Calculations:
Assumption:
Porosity is 15%
Volume Equation:

$$CV = \{3.1416(D^2)L\}/4$$

$$PV = CV(\text{porosity})/100$$

Where PV is the Pore Volume in cc, CV is the Core Volume in cc, D is the Core Diameter in cm and L is the Core Length in cm.

The above equation with the assumed 15% porosity, yields a pore volume of 1.93 cc per one inch of core length. For simplicity, a pore volume will be rounded up to 2.0 cc per inch of core length.

Example 10

A gas well is drilled into the Lobo 6 formation in western Texas to a depth of about 9,400 feet. The pay zone is in a low permeability sandstone. The bottom hole temperature is about 240° F. and the reservoir pressure is about 4,450 pounds per square inch (psi). The well is cemented conventionally and is perforated using 4 shots per foot of interval. The well is broken down with dilute hydrochloric acid and balled out. All perforations appear to be accepting fluid. The well is then fracture stimulated by injecting sequentially, at a pump rate of 28 barrels per minute (BPM), a pad fluid, a proppant bearing fracture fluid, and a flush according to the pumping schedule in Table 1 below:

TABLE 1

| Stage | Fluid | Stage Volume (gallons) | Stage Proppant* Concentration | (pounds) | Average Surface Pressure (psi) |
|---|---|---|---|---|---|
| 1 | Fluid A | 23,000 | 0.0 | 0.0 | 6,975 |
| 2 | Fluid A | 4,000 | 2.0 PPA | 8,000 | 7,065 |
| 3 | Fluid A | 4,000 | 3.0 PPA | 12,000 | 7,100 |
| 4 | Fluid A | 5,000 | 4.0 PPA | 20,000 | 7,215 |
| 5 | Fluid B | 8,000 | 5.0 PPA | 40,000 | 6,750 |
| 6 | Fluid B | 10,000 | 6.0 PPA | 60,000 | 6,340 |
| 7 | Fluid B | 4,000 | 7.0 PPA | 28,000 | 6,460 |
| 8 | Fluid B | 4,000 | 8.0 PPA | 32,000 | 6,665 |
| 9 | Fluid C | 3,300 | 0.0 | 0.0 | 5,860 |

*The proppant is a commercial resin-coated sand proppant.

Fluid A is an aqueous plymer solution of a guar derivative (CMHPG at 40 pounds of polymer per 1,000 gallons of fracture fluid), containing a zirconate crosslinker, a high temperature gel stabilizer, a clay stabilizer and pH buffering agents. Fluid B is an aqueous plymer solution of a guar derivative (CMHPG at 35 pounds of polymer per 1,000 gallons of fracture fluid), containing a zirconate crosslinker, a high temperature gel stabilizer, a clay stabilizer and a breaker for the gelled polymer. Fluids A and B further comprise the addition of n-decyl-N,N-dimethlyamine oxide so that each modified fluid contained the amine oxide at a concentration of 0.1 percent, weight-by-weight basis. In most cases, this corresponds to addign the surfactant at a ratio of between 1 and 2 gallons/thousand gallons; or 0.1–0.2% (v/v).

In Stage 1, Fluid A is pumped as a pad fluid to fracture the formation.

In Stages 2–8, a proppant is added to the modified fracture fluids A and B "on the fly" as the fluids are being pumped and is ramped up from an initial concentration of 2.0 PPA (pounds of proppant added) in Stage 2 to 8.0 PPA in Stage 8.

In Stage 9, Fluid C, a commercial fracture fluid, based on CMHPG at 35 pounds of polymer per 1,000 gallons of fracture fluid, is used as a "flush" to displace and push the proppant-bearing fracture fluid out of the tubing and into the formation. The amine oxide of the invention is typically not needed in this displacement/flush stage. After flush, the job is over, and the well is shut in.

The job is pumped to completion without incident. A propped fracture half-length ($X_f$) of about 820 feet is obtained with an average conductivity ($K_f w$) of about 1275 md.ft.

The well is then shut in for several hours and then flowed back. Cleanup is substantially improved (20–25% or greater) over previous jobs performed in offset wells using comparable flowback parameters (pressure and choke size). Gas production from the well is also substantially enhanced over previous offset wells.

Similar results are obtained using the fracture fluids and procedure set forth in Example 10 above except the CMHPG polymer was crosslinked by a titanate crosslinker.

Similar results are also obtained using the fracture fluids and procedure set forth in Example 10 above except guar is used as the viscosifier instead of CMHPG.

Similar results are also obtained using the fracture fluids and procedure set forth in Example 10 above except guar is used as the viscosifier instead of CMHPG and a titanate crosslinker is used instead of a zirconate crosslinker.

Similar results are also obtained using the fracture fluids and procedure set forth in Example 10 above except guar is used as the viscosifier instead of CMHPG and a borate crosslinker is used instead of a zirconate crosslinker. These fluids have a basic pH.

Contact Angle:

As mentioned before, some preferred amine oxides, in presence of the formation fluids, provide a desirable increase of the contact angle. The contact angles were measured according to a method consisting of packing finely divided solids into a tube and then measuring the rate at which a fluid penetrates into the pack. When an aqueous fluid contacts the pack of finely divided solids, it will begin to move into the pack as a front.

Assuming that the pack consists of a bundle of capillaries, it is possible to derive an expression to describe the rate that the fluid moves into the pack. According to Rosen, in "Surfactants and Interfacial Phenomena", Second Edition, John Wiley and Sons, 1989, p. 247, the distance, l, that a liquid with a viscosity, η, advances in time, t, is given by the following expression:

$$l^2 = \frac{(kr)t\gamma_{12}\cos\theta}{2\eta}$$

where r is the mean capillary size of the voids through the powder and k is a constant relating to the tortuosity. Obviously, then, the quantity kr depends on the packing of the solids. The quantity kr is measured by passing a fluid with a known surface tension through the pack; water is a convenient choice. The contact angle of the fluid of known surface tension is also known or assumed to be 0, which is a good assumption in the case where the test fluid is water and the pack consists of sand, clay, and silica flour. The method assumes that neither flocculation, dissolution nor dispersion changes the packing of the particles. We also assume that the contact angle of the blank, $\theta_1$, is 0. The method further assumes that surfactant concentration never falls below the critical micelle concentration due to adsorption of the surfactant. Finally, since some amine oxides may increase the viscosity of the test solution, we must account for any viscosity differences. So, we will let $\theta_2$ represent the viscosity of the test solution. If we further use the relative data for the length of the imbibition column, so $l_1=1$. We also know that the surface tension of water without surfactant, $\gamma_1=72$ dynes/cm, which leads to the following formula for the contact angle (in radians):

$$\theta_2 = \text{Arccos}\frac{72l_{rel}^2}{\gamma_2}.$$

The following table relates the imbibition data to contact angle.

| Sample | γ Dynes/cm | l Relative | θ Degrees |
|---|---|---|---|
| Blank | 72 | 1.00 | 0 |
| C8 DMAO | 39.4 | 0.11 | 88.8 |
| C10 DMAO | 37.0 | 0.26 | 82.5 |
| C12 DMAO | 43.1 | .36 | 76.3 |
| C14 DMAO | 42.6 | .21 | 57.8 |

-continued

| Sample | γ Dynes/cm | l Relative | θ Degrees |
|---|---|---|---|
| oleyl DMAO | 47.5 | .2 | <50 |
| F75N (prior art) | 21 | 0.41 | 54.8 |

X DMAO means an amine oxide according to formula I, where R1 is X and R2 and R3 are methyl.
Where X= Cn than X is a linear alkyl chain of n carbons.

It is particularly remarkable that several of the tested surfactants of the invention form a contact angle significantly greater than the contact angle of the F75N surfactant of the prior art, in particular, form a contact angle greater than 60 Degrees, and in some cases greater than 80 Degrees, and actually approaching 90 Degrees.

What is claimed is:

1. In the method of fracturing a subterranean formation penetrated by a well bore comprising injecting an aqueous based fracturing fluid, optionally carrying a proppant, into and through said wellbore at a pressure sufficient to fracture said subterranean formation to thereby create a continuous conductive zone from the tip of the fracture back to the wellbore, the improvement consisting of adding a small but sufficient amount of an amine oxide to promote rapid cleanup of the filtrate and increase permeability of the formation to hydrocarbon fluids, said amine oxide corresponding to the formula:

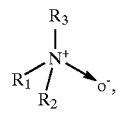

wherein R1 is an aliphatic group of from 6 to about 20 carbon atoms, and wherein $R_2$ and $R_3$ are each independently alkyl of from 1 to about 4 carbon atoms.

2. The fracturing method defined by claim 1 wherein the amine oxide is present in at least the initial portions of the fracture fluid that is injected into the well (the pad fluid).

3. The fracturing method defined by claim 1 wherein the amine oxide is added to the fracture fluid essentially constantly throughout the fracturing treatment.

4. The fracturing method defined by claim 1 wherein said amine oxide is added in amounts of from 0.01 to about 1 percent, weight by weight basis.

* * * * *